United States Patent
Kim et al.

(10) Patent No.: US 9,086,324 B2
(45) Date of Patent: Jul. 21, 2015

(54) DIGITAL PHOTOMULTIPLIER DETECTOR CELL

(71) Applicants: Samsung Electronics Co., Ltd., Suwon-Si, Gyeonggi-Do (KR); Industry-University Cooperation Foundation Sogang University, Seoul (KR)

(72) Inventors: Young Kim, Yongin-si (KR); Jae-chul Park, Suwon-si (KR); Dae-kun Yoon, Daegu (KR); Chae-hun Lee, Suwon-si (KR); Jin-wook Burm, Seoul (KR); Kyung-hoon Kim, Seoul (KR); Jun-an Lee, Seoul (KR)

(73) Assignees: SAMSUNG ELECTRONICS CO., LTD., Gyeonggi-Do (KR); INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 157 days.

(21) Appl. No.: 13/763,944

(22) Filed: Feb. 11, 2013

(65) Prior Publication Data

US 2013/0248720 A1    Sep. 26, 2013

(30) Foreign Application Priority Data

Mar. 26, 2012    (KR) .......................... 10-2012-0030654

(51) Int. Cl.
    G01T 1/20      (2006.01)
    G01J 1/44      (2006.01)
    G01T 1/208     (2006.01)

(52) U.S. Cl.
    CPC ................. *G01J 1/44* (2013.01); *G01T 1/2006* (2013.01); *G01T 1/208* (2013.01)

(58) Field of Classification Search
    CPC .... G01J 2001/442; G01J 1/44; G01T 1/2006; G01T 1/208
    See application file for complete search history.

(56) References Cited

U.S. PATENT DOCUMENTS

| 7,723,964 B2 | 5/2010 | Taguchi |
| 7,737,404 B2 | 6/2010 | Musrock |
| 2001/0020673 A1* | 9/2001 | Zappa et al. .............. 250/214 R |
| 2006/0192086 A1* | 8/2006 | Niclass et al. ............. 250/214.1 |
| 2006/0202129 A1* | 9/2006 | Niclass et al. ........... 250/370.14 |

(Continued)

FOREIGN PATENT DOCUMENTS

| JP | 2009092670 A | 4/2009 |
| KR | 20080009082 A | 1/2008 |

OTHER PUBLICATIONS

C.L.F. Ma et al, "Temperature dependence of breakdown voltages in separate absorption, grading, charge, and multiplication In{/ OmGaAs avalanche photodiodes.", IEEE Transactions on Electron Devices, vol. 42, Issue 5, Part 1, pp. 810-818, 1995.

*Primary Examiner* — Constantine Hannaher
(74) *Attorney, Agent, or Firm* — Harness, Dickey & Pierce, P.L.C.

(57) ABSTRACT

A photomultiplier detector cell for tomography includes a detector unit and a readOUT unit. The detector unit is configured to generate a digitized detect signal in response to receives light having a certain range of wavelength. The readOUT unit is configured to generate an output signal corresponding to the detect signal generated by the detector unit and to transmit the output signal to an external circuit. The readOUT unit is configured to transmit the output signal to the external circuit right after the detect signal is received.

41 Claims, 13 Drawing Sheets

(56) References Cited

U.S. PATENT DOCUMENTS

| | | | |
|---|---|---|---|
| 2008/0203309 A1* | 8/2008 | Frach et al. | 250/362 |
| 2010/0076300 A1 | 3/2010 | Arseneau et al. | |
| 2010/0252723 A1 | 10/2010 | Frach et al. | |
| 2011/0079727 A1 | 4/2011 | Prescher et al. | |
| 2011/0133091 A1 | 6/2011 | Frach et al. | |
| 2011/0266420 A1* | 11/2011 | Eldesouki et al. | 250/214.1 |
| 2012/0267513 A1 | 10/2012 | Jeon et al. | |

* cited by examiner

DIGITAL PHOTOMULTIPLIER DETECTOR CELL

CROSS-REFERENCE TO RELATED APPLICATIONS

This application claims priority under 35 U.S.C. §119 to Korean Patent Application No. 10-2012-0030654, filed on Mar. 26, 2012, in the Korean Intellectual Property Office, the disclosure of which is incorporated herein in its entirety by reference.

BACKGROUND

1. Field

Example embodiments relate to photomultiplier detector cells, and more particularly, to photomultiplier detector cells using a digital signal.

2. Description of the Related Art

Methods of imaging the inside of the human body include positron emission tomography (PET), magnetic resonance tomography (MRI), X-ray computed tomography (CT), and the like. PET is one of the nuclear medicine diagnosis methods by which physiological and pathological images of human bodies are obtained by detecting emitted positrons by using a radioactive tracer substance. A diagnosis method by PET is performed such that a radioactive isotope, e.g., F-18-FDG (an analogue of glucose), is introduced into the human body, and radiation emitted as a result of cancer cells inside the body absorbing the radioactive isotope is detected after a certain period of time (e.g., tens of minutes), thereby obtaining position information of the cancer. Detectors for detecting radiation emitted as a result of cancer cells inside the body absorbing a radioactive isotope are referred to as silicon photomultiplier detectors or gamma-ray detectors. In addition, apparatuses for detecting radiation or gamma-rays may be used in radiation detectors used for single photon emission computed tomography (SPECT) or computed tomography and in various applications such as astronomy and space science.

SUMMARY

Example embodiments relate photomultiplier detector cells that are configured to collect image material in a constant surface area at a relatively high density.

Additional aspects will be set forth in part in the description which follows and, in part, will be apparent from the description, or may be learned by practice of example embodiments.

According to example embodiments, a photomultiplier detector cell for tomography includes: a detector unit that is configured to generate a digitized detect signal in response to receiving light having a certain range of wavelength; and a readOUT unit. The readOUT unit is configured to generate an output signal corresponding to the detect signal generated by the detector unit and to transmit the output signal to an external circuit. The readOUT unit is configured to transmit the output signal to the external circuit right after the detect signal is received.

In example embodiments, the readout unit may be configured to the detect signal is not stored in the photomultiplier detector cell.

In example embodiments, the detector unit may include a photomultiplier. The photomultiplier may be a silicon device.

In example embodiments, the detector unit may further include a photo diode that is configured to generate a current to flow in response to the light having the certain range of wavelength; and an active reset unit that is connected to a cathode of the photo diode, wherein the active reset unit is configured to increase a voltage difference between the cathode and an anode of the photo diode.

In example embodiments, the detector unit may further include a passive quenching unit that is connected to the cathode of the photo diode and configured to decrease the voltage difference between the cathode and the anode of the photo diode when the current flows in the photo diode.

In example embodiments, the passive quenching unit may include a capacitor, and a voltage applied to the capacitor may be controlled.

In example embodiments, the detect signal may undergo a transition from a first voltage level to a second voltage level in response to the reception of the light having the certain range of wavelength and the detect signal may undergo a transition from the second voltage level to the first voltage level when the reception of the light having the certain range of wavelength is stopped.

In example embodiments, the photomultiplier detector cell may be connected to a scintillator that is configured to receive radiation to generate the light having the certain range of wavelength.

In example embodiments, the detector unit may be configured to receive the light having the certain range of wavelength that is generated by the scintillator, and the light having the certain range of wavelength may be visible light having a wavelength of about 400 nm to about 450 nm.

According to example embodiments, a radiation detecting system for tomography includes an accumulator, and at least one photomultiplier detector cell. Each photomultiplier detector cell may include: a detector unit that that is configured to generate a digitized detect signal in response to receiving light having a certain range of wavelength; and a readOUT unit configured to generate an output signal corresponding to the detect signal generated by the detector unit and to transmit the output signal to the accumulator. The readOUT unit may be configured to transmit the output signal to the accumulator right after the detect signal is generated by the detector unit, where the accumulator is positioned outside the photomultiplier detector cell and configured measures an amount of radiation based on the output signal received by the readOUT unit.

In example embodiments, the readOUT unit may be configured so the output signal is not stored in the photomultiplier detector cell.

In example embodiments, a photomultiplier included in the photomultiplier detector cell may include a silicon device.

In example embodiments, the accumulator may include a current mirror circuit.

In example embodiments, the at least one photomultiplier cell may include a plurality of photomultiplier cells, and the accumulator may include a plurality of current mirrors. The accumulator may be configured to generate a plurality of digital signals based on turning on or turning off a transistor of each of the plurality of current mirrors in response to the output signal received from the readOUT units of het plurality of photomultiplier cells, and the accumulator may include a count unit that is configured to receive the plurality of digital signals and to measure an amount of radiation based on the plurality of digital signals.

In example embodiments, a transistor at an output terminal of the current mirror may be connected to a resistor, and the accumulator may be configured to measure an amount of radiation based on an intensity of a voltage applied between both terminals of the resistor.

In example embodiments, the detector unit may include a photo diode that is configured to generate a current to flow in response to the light having the certain range of wavelength; and an active reset unit that is connected to a cathode of the photo diode, wherein the active reset unit is configured to increases a voltage difference between the cathode and an anode of the photo diode.

In example embodiments, the detector unit may further include a passive quenching unit that is connected to the cathode of the photo diode, and the passive quenching unit may be configured to decrease the voltage difference between the cathode and the anode of the photo diode when the current flows in the photo diode.

In example embodiments, the passive quenching unit may include a capacitor, and a voltage of the capacitor may be controlled by environmental changes of the photomultiplier detector cell.

In example embodiments, the photomultiplier detector cell may be connected to a scintillator that is configured to receive radiation and to generate the light having the certain range of wavelength, wherein the detector unit of the at least one photomultiplier detector cell may be connected to the scintillator.

The detector unit may receive the light having the certain range of wavelength that is generated by the scintillator, wherein the light having the certain range of wavelength is visible light having a wavelength of about 400 nm to about 450 nm.

According to example embodiments, a detecting device included in a photomultiplier detector cell for tomography includes: a photo diode that is configured to generate a current to flow in response to light having a certain range of wavelength; and an active reset unit that is connected to a cathode of the photo diode. The active reset unit may be configured to increase a voltage difference between the cathode and anode of the photo diode.

In example embodiments, the detecting device may further include a passive quenching unit that is connected to the cathode of the photo diode, and the passive quenching unit may be configured to decrease the voltage difference between the cathode and the anode of the photo diode when the current flows in the photo diode.

In example embodiments, the passive quenching unit may include a capacitor, and a voltage of the capacitor may be controlled by environmental changes of the photomultiplier detector cell.

In example embodiments, the detecting device may be configured to generate a digitized detect signal in response to the light having the certain range of wavelength, and the detecting device may be configured so the detect signal is not stored in the photomultiplier detector cell.

In example embodiments, the detect signal may undergo a transition from a first voltage level to a second voltage level in response to the reception of the light having the certain range of wavelength, and undergo a transition from the second voltage level to the first voltage level when the reception of the light having the certain range of wavelength is stopped.

In example embodiments, the light having the certain range of wavelength may be visible light having a wavelength of about 400 nm to about 450 nm.

According to example embodiments, a detector unit in a photomultiplier detector cell for tomography that is not configured to store a detect signal generated from a light-sensing element may include the light sensing element and an active reset unit. The light-sensing element may be configured to generate the detect signal in response to receiving light having a certain range of wavelength. The active reset unit may be connected to a first terminal of the light-sensing element. The active reset unit may be configured to increase a voltage difference between the first terminal and a second terminal of the light-sensing element.

According to example embodiments, a photomultiplier detector cell including a readOUT unit that is configured to generate an output signal after receiving a digitized detect signal, and a detector unit. The readOUT unit may be configured to transmit the output signal to an external circuit without the output signal being stored in the photomultiplier detector cell. The detector unit may be configured to generate the digitized detect signal in response to receiving light having a certain range of wavelength. The detector unit may be configured to transmit the digitized detect signal to the readOUT unit without the detect signal being stored in the photomultiplier detector cell.

In example embodiments, the detector unit may include a photo diode and at least one of a passive quenching unit and an active quenching unit. The at least one of the passive quenching unit and the active quenching unit may be electrically connected to a cathode of the photo diode.

In example embodiments, the detector unit may include the passive quenching unit. The passive quenching unit may be configured to receive a supply voltage that is lower than a breakdown voltage of the photo diode. The passive quenching unit may include one of a resistor and a capacitor.

In example embodiments, the photo diode may be connected a scintillator outside of the photomultiplier detector cell.

In example embodiments, the photo diode may be configured to generate a current in response to receiving the light having the certain range of wavelength, the detector unit may include the passive quenching unit and the active quenching unit, and the detector unit may further include an active reset unit connected to the cathode of the photo diode. The passive quenching unit, the active quenching unit, and the active reset unit, in combination, may be configured to convert the current from the photo diode into the digitized detect signal.

In example embodiments, the passive quenching unit may include one of a resistor and a capacitor. The active quenching unit and the active reset unit may each include a transistor.

In example embodiments, the detector unit may include a photo diode, and an active reset unit that is electrically connected between a cathode of the photo diode and a supply voltage node. The supply voltage node may be configured to supply a supply voltage that is lower than a breakdown voltage of the photo diode. The active reset unit may be configured to increase a voltage difference between the cathode and an anode of the photo diode.

In example embodiments, the detector unit may further include a passive quenching unit that is electrically connected between a supply voltage node and the cathode of the photo diode. The passive quenching unit may include one of a resistor and a capacitor.

In example embodiments, the detector unit may further include an active quenching unit that is electrically connected between a ground voltage node and the cathode of the photo diode.

In example embodiments, the passive quenching unit and the active reset unit may be electrically connected in parallel between the cathode of the photo diode and the supply voltage node.

In example embodiments, a radiation detecting system may include an accumulator, a cell array, and a data line. The cell array may include a plurality of photomultiplier detector cells connected to a plurality of switches, respectively, and a current source. Each of the plurality switches may be configured to be turned on and supply current from the current source when a corresponding one of the plurality of photomultiplier detector cells detects radiation and be configured to be turned off when the corresponding one the plurality of photomultiplier detector cells does not detect radiation. The data may transport a current signal to the accumulator according to a number of the plurality of photomultiplier detectors cells detecting radiation.

In example embodiments, the accumulator may include a current mirror circuit and a count unit. The current mirror circuit may be configured to adjust the current signal and to transmit the adjusted current signal to the count unit. The count unit may be configured to determine the number of the plurality of photomultiplier detectors cells detecting radiation based upon converting the adjusted current signal into a count signal.

In example embodiments, the accumulator may include a current mirror circuit and a count unit. The current mirror circuit may be configured to adjust the current signal into a voltage signal and to transmit the voltage signal to the count unit. The count unit may be configured to determine the number of the plurality of photomultiplier detectors cells detecting radiation based upon converting the voltage signal into a count signal.

According to example embodiments, a method of operating a radiation detecting system may include exposing a radiation-emitting source to a cell array that includes a scintillator and a switching circuit connected to a plurality of photomultiplier detector cells. The scintillator may be configured to generate light having a certain range of wavelength (e.g., visible light) based on radiation received from the radiation-emitting source (e.g., gamma-ray radiation). Each of the plurality of photomultiplier detector cells may include a detector unit that is configured to generate a digitized detect signal in response to receiving the light, and a readOUT unit that is configured to generate an output signal after receiving the digitized detect signal and to transmit the output signal to the switching circuit right after receiving the digitized detect signal. The method may further include transmitting a current signal from the switching circuit to an accumulator that is located outside of the cell array, where the current signal may correspond to a number of the plurality of photomultiplier detector cells detecting light.

BRIEF DESCRIPTION OF THE DRAWINGS

These and/or other aspects will become apparent and more readily appreciated from the following description of non-limiting embodiments, as illustrated in the accompanying drawings in which like reference characters refer to the same parts throughout the different views. The drawings are not necessarily to scale, emphasis instead being placed upon illustrating the principles of example embodiments. In the drawings.

DETAILED DESCRIPTION

Figure 1:
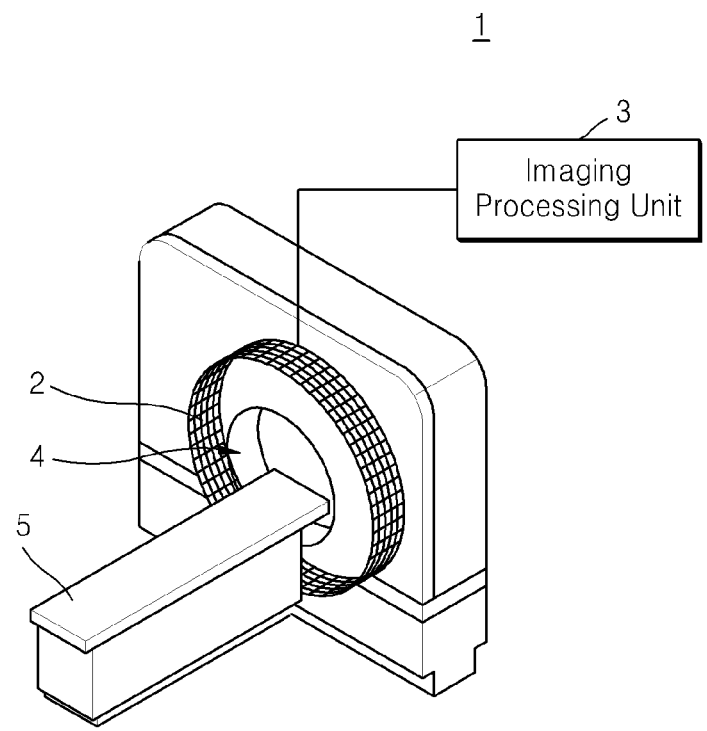
FIG. 1 is a schematic diagram illustrating a radiation measuring device, according to example embodiments.

Example embodiments will now be described more fully with reference to the accompanying drawings, in which some example embodiments are shown. Example embodiments, may however, be embodied in many different forms and should not be construed as being limited to embodiments set forth herein. Rather, these example embodiments are provided so that this disclosure will be thorough and complete, and will fully convey the scope of example embodiments to one of ordinary skill in the art. In the drawings, the thicknesses of layers and regions are exaggerated for clarity. Like reference numerals in the drawings denote like elements, and thus their description may be omitted.

The terminology used herein is for the purpose of describing particular embodiments only and is not intended to be limiting of example embodiments. As used herein, the singular forms are intended to include the plural forms as well, unless the context clearly indicates otherwise. It will be further understood that the terms "comprises" and/or "comprising," when used in this specification, specify the presence of stated features, integers, steps, operations, components, elements, and/or groups thereof, but do not preclude the presence or addition of one or more other features, integers, steps, operations, components, elements, and/or groups thereof. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first, second, etc." may be used herein to describe various elements, components, regions, layers, and/or sections, these elements, components, regions, layers, and/or sections should not be limited by these terms. These terms are only used to distinguish one element, component, region or section from another element, component, region or section. Thus, a first element, component, region or section discussed below could be termed a second element, component, region or section without departing from the teachings of example embodiments.

Hereafter, example embodiments will be described with reference to the accompanying schematic drawings. In the drawings, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic diagram illustrating a radiation measuring device 1, according to example embodiments.

As illustrated in FIG. 1, the radiation measuring device 1 may include a plurality of radiation measuring modules 2, an imaging processing unit 3, and an imaging zone 4.

The imaging zone 4, which is a zone for accommodating a target, is a zone provided to measure an image of the target. To support the target, the imaging zone 4 may include a support 5. The radiation measuring modules 2 may receive radiation from the target and convert the radiation to a detect signal. Each radiation measuring module 2 may include a plurality of radiation detecting modules 20 (refer to FIG. 2). This feature will be described below in more detail. The imaging processing unit 3 may produce an image of a target based on the detect signal generated by the radiation measuring module 2.

Figure 2:
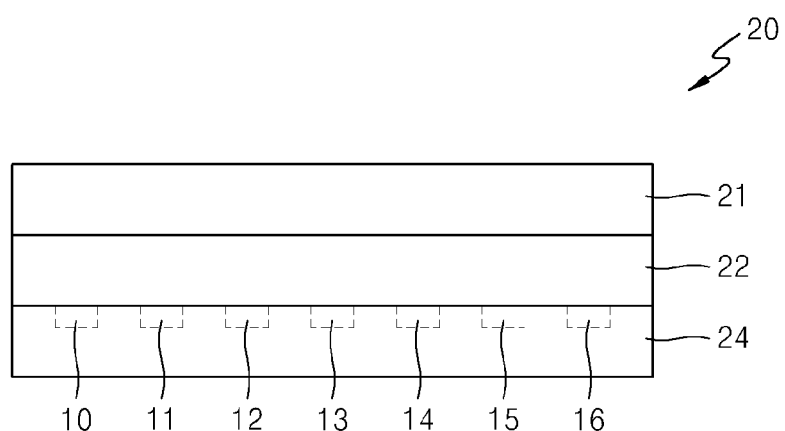
FIG. 2 is a schematic cross-sectional view of a radiation detecting module, according to example embodiments.

FIG. 2 is a schematic cross-sectional view of a radiation detecting module 20, according to example embodiments.

As illustrated in FIG. 2, the radiation detecting module 20 may include a scintillator 21, an optical pipe 22, pixel elements 10, 11, 12, 13, 14, 15 and 16, and a semiconductor chip 24.

The scintillator 21 may receive radiation (e.g., gamma rays) to generate photons. The optical pipe 22 may be disposed between the scintillator 21 and the semiconductor chip 24, and deliver the photons generated by the scintillator 21 to the semiconductor chip 24. In this regard, an incident direction of the photons delivered to the semiconductor chip 24 is not particularly limiting. For example, the photons may be incident from an upper portion of the scintillator 21 or incident through a lower portion of the semiconductor chip 24. In this case, the semiconductor chip 24 may be made of a material enabling photons to pass therethrough.

The semiconductor chip 24 may include a plurality of pixel elements 10, 11, 12, 13, 14, 15 and 16 that are arranged in an array form so that the semiconductor chip 24 receives the photons delivered through the optical pipe 22 and produces an electrical signal corresponding to the photons. Each of the pixel elements 10, 11, 12, 13, 14, 15 and 16 may include a plurality of detector cells 100 illustrated in FIG. 3. For example, when each pixel element includes 16 detector cells 100 and the pixel elements are arranged in the semiconductor chip 24 in a 7×7 array configuration, the semiconductor chip 24 may include 784 (7×7×16) detector cells 100. The detector cells 100 may be generally represented as microcells. If each microcell (e.g., detector cell 100) includes two photo diodes, the semiconductor chip 24 may include 1,568 (7×7×16×2) photo diodes.

Figure 3:
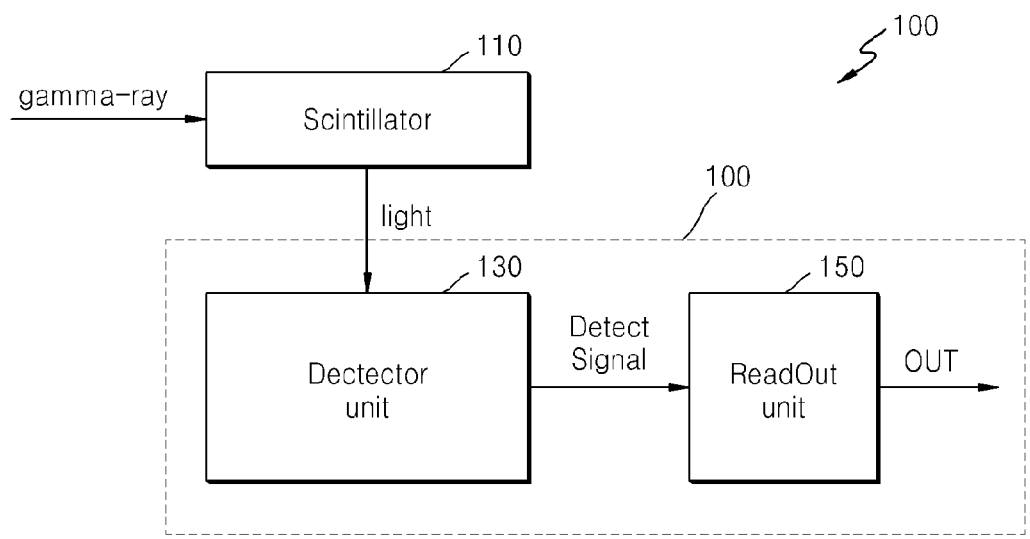
FIG. 3 is a diagram illustrating a detector cell included in a photomultiplier for tomography, according to example embodiments.

FIG. 3 is a diagram illustrating a detector cell 100 included in a photomultiplier for tomography, according to example embodiments.

As illustrated in FIG. 3, the detector cell 100 of a photomultiplier for tomography may include a detector unit 130, and a readOUT unit 150. The detector unit 130 may be configured to receive light from the scintillator 110. The scintillator 110 may be arranged to generate photons for delivering light to detector units 130 in a plurality of detector cells 100.

The photomultiplier may include pixel elements including at least 500 microcells, each of which has a size of about 20 μm. Each microcell independently detects and amplifies photons. The photomultiplier may be a silicon device, such as a photomultiplier ("SiPM"), but example embodiments are not limited thereto and other materials for the photomultiplier may be suitable. When photons enter each microcell to generate an electron-hole pair, amplification occurs therein due to an electric field inside the SiPM, whereby each microcell generates and outputs a certain size of a signal. In this case, an output signal of the SiPM may be a signal obtained by summing the signals of all the microcells.

The scintillator 110 receives radiation to generate photons. That is, a radioactive isotope (e.g., F-18-FDG) introduced into a patient or an object experiences a radioactive decay event. The radioactive decay event involves generation of positrons. The positrons generated by the radioactive decay event interact with the surrounding electrons, thereby causing an electron-positron annihilation event. The electron-positron annihilation event produces two oppositely directed radiation beams having an energy of 511 keV. The radiation beams travel at the speed of light. When these radiation beams collide with the scintillator 110, light (or photons) is (are) emitted. In this case, light emitted from the scintillator 110 may be visible light. In particular, the light emitted from the scintillator 110 may be visible light having a wavelength of about 400 nm to about 450 nm. In this regard, the scintillator 110 may be made of lutetium oxyorthosilicate (LSO), lutetium yttrium oxyorthosilicate (LYSO), mixed lutetium silicate (MLS), lutetium gadolinium oxyorthosilicate (LGSO), lanthanum bromide (LaBr), or a combination thereof. However, the material of the scintillator 110 is not limited thereto and other scintillator materials may also be used. The detector unit 130 receives the photon emitted from the scintillator 110 to generate a detect signal. The detect signal may be a digitized electrical signal. For example, the detection signal may have a first digital value when the detector unit 130 does not receive light and have a second digital value when the detector unit 130 receives light. In other words, the detector unit 130 may be configured so the detect signal undergoes a transition from a first voltage level to a second voltage level in response to the reception of light (e.g., visible light) from the scintillator 110, and the detector unit 130 may be configured to the detect signal undergoes a transition from the second voltage level to the first voltage level when the reception of light from the scintillator 110 is stopped, where the first and second voltage levels are different. The detector unit 130 may include a photo diode. The photo diode receives light to generate an electrical signal. The electrical signal is an analogue signal, which may be converted to a digital signal after having undergone passive and active quenching and active reset processes.

Although the material of the scintillator 110 in FIG. 3 may be selected for a gamma-ray detection application, example embodiments are not limited thereto. In different imaging applications, a different material for the scintillator may be used. For example, in X-ray detection, the material of the scintillator 110 may be CsI for configuring the scintillator 110 to convert X-ray radiation into visible light that may be converted by the detector unit 130 into the detect signal.

Figure 4:
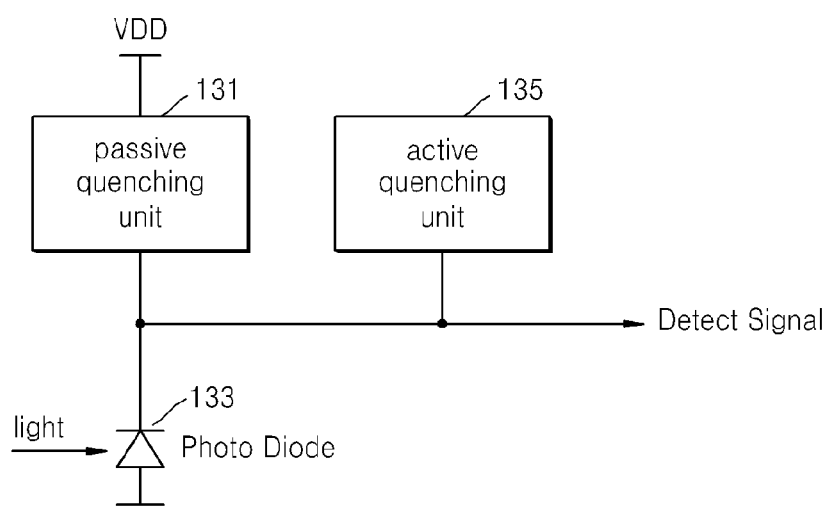
FIG. 4 is a diagram illustrating elements of a detector unit, according to example embodiments.

FIG. 4 is a diagram illustrating elements of a detector unit 130, according to example embodiments.

Referring to FIG. 4, the detector unit 130 may include a photo diode 133, a passive quenching unit 131, and an active quenching unit 135.

The photo diode 133 may generate a current based on photons emitted from the scintillator 110. The detector unit 130 may include a plurality of photo diodes 133, and each photo diode 133 may be included in each of a plurality of cells. For example, the photo diode 133 may be an avalanche photo diode. A supply voltage VDD that is applied may be a little lower than an operating voltage (e.g., breakdown voltage when an avalanche photo diode is used as the photo diode 133) of the photo diode 133. In this case, when the photo diode 133 receives the photons, the operating voltage thereof becomes equal to or less than the supply voltage VDD. Therefore, a current flows in the photo diode 133.

The photo diode 133 may include two terminals, for example an anode and a cathode. The passive quenching unit 131 may be connected to the cathode of the photo diode 133.

The passive quenching unit 131 generates a voltage difference between both terminals thereof in a state where a current flows in the photo diode 133. The passive quenching unit 131 may include, for example, a resistor and an equivalent circuit. A voltage drop generated by the passive quenching unit 131 reduces a voltage applied to the photo diode 133. For example, when the passive quenching unit 131 is an equivalent circuit and a resistor, the higher the intensity of the current flowing in the photo diode 133, the higher a voltage drop occurring in the passive quenching unit 131. Therefore, as the intensity of the current that flows in the photo diode 133 increases, the intensity of the voltage applied to the photo diode 133 decreases. This is attributed to a constant supply voltage VDD. As a result, the intensity of the current that flows in the photo diode 133 increases, and at some point a voltage that is lower than the operating voltage of the photo diode 133 is applied on the photo diode 133. Therefore, the flow of the current generated when the photo diode 133 receives the photons is stopped by the passive quenching unit 131.

The active quenching unit 135 shortens a time taken to stop current from flowing again, which is performed by the passive quenching unit 131. That is, if the passive quenching unit 131 maintains a voltage between both terminals of the photo diode 133 as an operating voltage of the photo diode 133, the active quenching unit 135 shortens a time taken for the voltage between both terminals of the photo diode 133 to change from the supply voltage VDD to the operating voltage of the photo diode 133. As a result, a recovery time of the photo diode 133 may be shortened, and resolution of the detector unit 130 may be increased.

The detector unit 130 operates as follows. The photo diode 133 produces a current based on photons received by the scintillator 110. In this regard, the voltage between both terminals of the photo diode 133 is set by the passive quenching unit 131 to be an operating voltage level of the photo diode 133, and the active quenching unit 133 shortens the time taken to change the voltage of the photo diode 133.

Referring back to FIG. 3, the readOUT unit 150 receives a detect signal to generate an output signal OUT. According to example embodiments, the output signal OUT is not stored in a buffer or a separate memory, but is generated correspondingly to the detect signal. In other words, the readOUT 150 unit and detector cell 100 may be configured so as to not store the detect signal and/or the output signal. The output signal OUT is transmitted to an external circuit of the detector cell 100 of a photomultiplier. The external circuit may include an accumulator illustrated in FIG. 8.

Hereinafter, an operation of a detector cell 100 included in a photomultiplier, according to example embodiments, will be described. A radioactive isotope that has been introduced into a patient or an object generates a gamma-ray through a radioactive decay event. The scintillator 110 receives the gamma-ray and emits photons. The detector unit 130 receives the photons emitted from the scintillator 110 to generate a detect signal. The readOUT unit 150 receives the detect signal generated by the detector unit 130 to generate an output signal OUT in the form of a signal format that an external circuit can receive, without separately storing or counting the detect signal. The output signal OUT is transmitted to the external circuit.

Therefore, a photomultiplier, according to example embodiments, does not store the detect signal in the detector cell 100 (or a microcell). Right after receiving the detect signal, the readOUT unit generates the output signal OUT, which is then transmitted to the external circuit. Therefore, a space for an internal memory or a buffer is not needed, the size of a chip may be reduced, and integration may be obtained. The photomultiplier may increase a fill factor. The fill factor denotes an area ratio of a detecting part to a detector cell. For example, the fill factor may be increased up to 65% or more.

In addition, an energy resolution of the detector cell 100 does not depend on the capacity of an internal memory or a buffer, but depends on the capacity of a memory of the external circuit, and thus, a detector cell with high energy resolution may be obtained. In particular, the photomultiplier may have a full width at half maximum (FWHM), which denotes an energy resolution of 10% or less.

In addition, an energy dynamic range may be obtained by multiplying the number of the detector cells 100 (or microcells) by the capacity of a memory for storing the detect signal generated by the detector cell 100. The energy resolution of the detector cell 100 does not depend on the capacity of an internal memory, but instead may depend on the capacity of an external memory. The capacity of internal memory may be restricted by the size of the detector cell 100, while the capacity of the external memory may be relatively large. Therefore, the energy dynamic range increases in proportion to the capacity of the external memory.

Figure 5A:
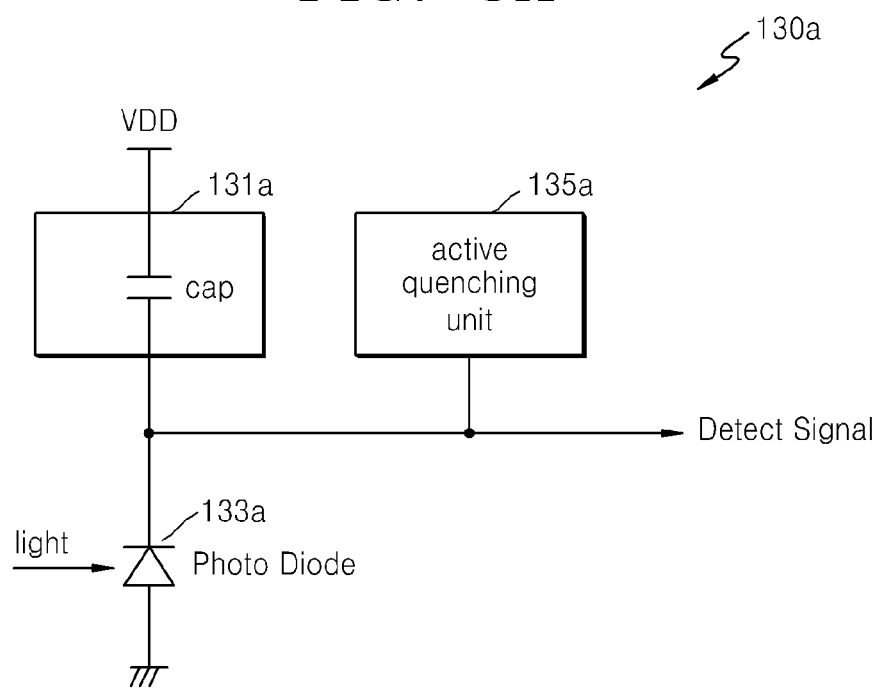
FIG. 5A is a diagram illustrating elements of a detector unit, according to example embodiments.

FIG. 5A is a diagram illustrating elements of a detector unit 130a, according to example embodiments.

Referring to FIG. 5A, the detector unit 130a includes a photo diode 133a, a passive quenching unit 131a, an active quenching unit 135a, wherein the passive quenching unit 131a includes a capacitor CAP (capacitor or equivalent circuit). A voltage stored in the capacitor CAP (capacitor or equivalent circuit) of the passive quenching unit 131a may be controlled according to a temperature, processes, and other factors (e.g. environmental change). Therefore, although an operating voltage of the photo diode 133a varies according to temperatures, processes, and other factors (environmental change), a quenching operation may be performed.

Figure 5B:
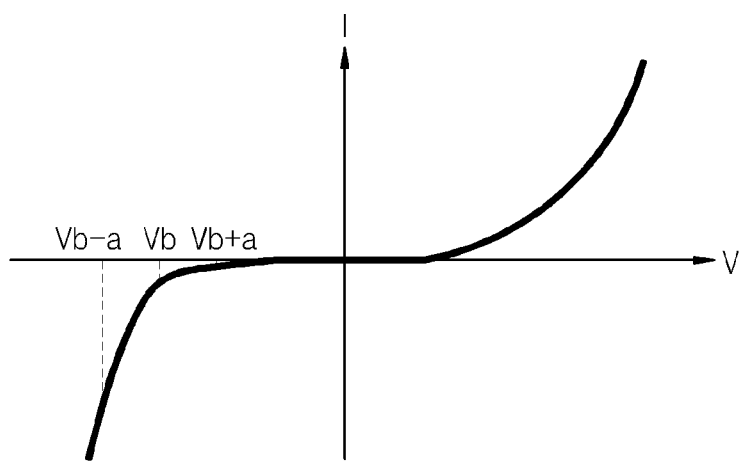
FIG. 5B is a characteristic curve of a photo diode, which is illustrated for explaining a method of controlling a passive quenching unit of the detector unit of FIG. 5A, according to example embodiments.

FIG. 5B is a characteristic curve of a photo diode, which is illustrated for explaining a method of controlling a passive quenching unit 131a of the detector unit of FIG. 5A, according to example embodiments.

Referring to FIG. 5B, a voltage applied between both terminals of the photo diode 133 may vary according to temperatures, processes, and other factors (environmental change). For example, if the operating voltage of the photo diode 133 is represented as Vb, the voltage applied between both terminals of the photo diode 133 may be increased to Vb+a, according to temperatures, processes, and other environmental changes. In this case, a small amount of current flows in the photo diode 133, and thus, a circuit of the detector unit 130a may not operate. Thus, a voltage applied to the capacitor CAP increases so that the voltage applied between both terminals of the photo diode 133 is set to be Vb, whereby the circuit of the detector unit 130a may normally operate. Also, the voltage applied between both terminals of the photo diode 133 may be decreased to Vb−a, according to temperatures, processes, and other factors (environmental change). In this case, an excessively large current flows in the photo diode 133, and thus, the circuit of the detector unit 130a may malfunction due to the overcurrent. Thus, the voltage applied to the capacitive element CAP is reduced so that the voltage applied between both terminals of the photo diode 133 is controlled to be equal to Vb, whereby the circuit of the detector unit 130a may normally operate.

Figure 6A:
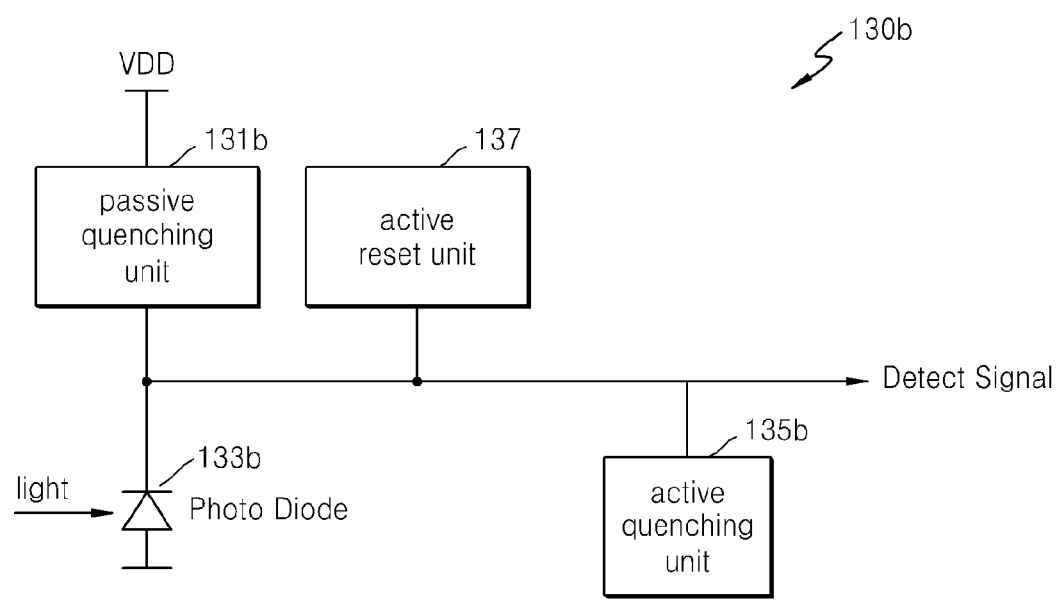
FIG. 6A is a diagram illustrating elements of a detector unit, according to example embodiments.

FIG. 6A is a diagram illustrating elements of a detector unit 130b, according to example embodiments.

Referring to FIG. 6A, the detector unit 130b includes a photo diode 133b, a passive quenching unit 131b, an active quenching unit 135b, and an active reset unit 137.

If the photo diode 133b stops receiving photons, a voltage between both terminals of the photo diode 133b is restored to a supply voltage VDD. In this regard, the active reset unit 137 shortens a time taken to restore the voltage between both terminals of the photo diode 133b to the supply voltage VDD. Therefore, when the subsequent photons are received, this enables the detection of the photons. That is, if the restoration time lengthens, the first received photons are difficult to distinguish from the subsequently received photons, and thus, this may be regarded as one-time reception of photons, resulting in low energy resolution. Therefore, the detector unit 130b includes the active reset unit 137, thereby shortening the restoration time and increasing the energy resolution.

Figure 6B:
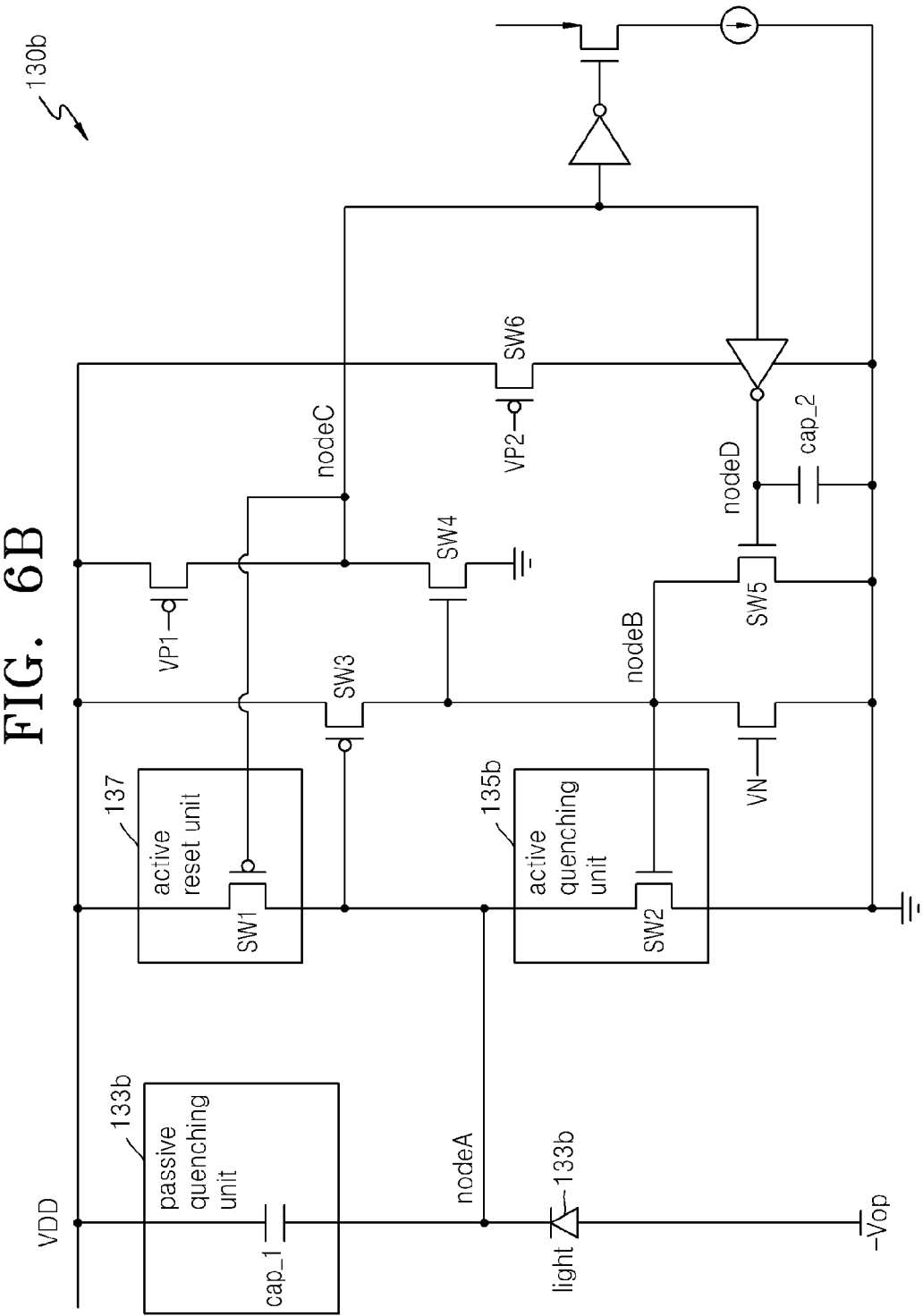
FIG. 6B is a circuit diagram of a detector unit, according to example embodiments.

FIG. 6B is a circuit diagram of a detector unit 130b, according to example embodiments.

Referring to FIG. 6B, the active quenching unit 135b may include a switch transistor SW2. The active reset unit 137 may include a switch transistor SW1. The passive quenching unit 133b may include a capacitor CAP_1.

Figure 6C:
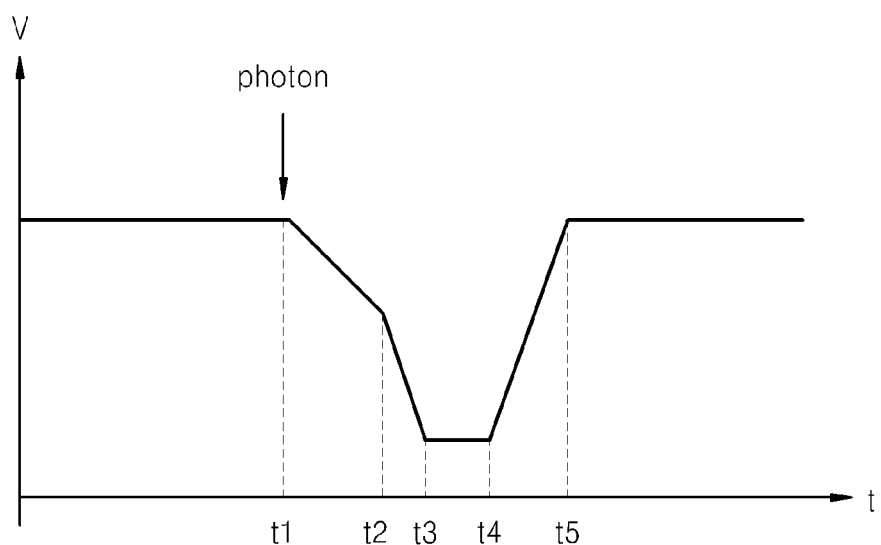
FIG. 6C is a timing graph showing a voltage between both terminals of a photo diode of the detector unit of FIG. 6B according to time, according to example embodiments.

FIG. 6C is a timing graph showing a voltage between both terminals of a photo diode of the detector unit 130b of FIG. 6B according to time, according to example embodiments.

Referring to FIGS. 6B and 6C, when a photo diode receives photons at a time t1, current flows in a node A, and a voltage between both terminals of the photo diode decreases. That is, a voltage of the node A decreases so that a logic LOW is applied to the node A. In other words, passive quenching occurs. Thus, a switch SW3 is switched on to apply a supply voltage VDD to a node B so that the node B enters a logic high state, and the switch transistor SW2 and a switch SW4 are in an ON state. Therefore, the voltage of the node A at a time period from t2 to t3 rapidly decreases. That is, active quenching occurs. The switch SW4 is switched on so that a voltage of a node C decreases, and thus, the node C enters a low state. Accordingly, the switch transistor SW1 is switched on. Therefore, the voltage of the node A at a time period from t3 to t4 maintains equilibrium. Since the node C enters a low state, a voltage of a node D enters a high state. In this regard, since the node C enters a low state, a time taken for the node D to enter a high state may be controlled by a switch SW6 and a capacitor CAP_2. Therefore, the node C enters a low state, and after a certain period of time a switch SW5 is switched on so that a voltage of a node B enters a low state. As a result, the switch transistor SW2 is switched off, and a voltage of the node A at a time period from t4 to t5 is restored to the voltage VDD. That is, an active reset occurs.

Figure 7:
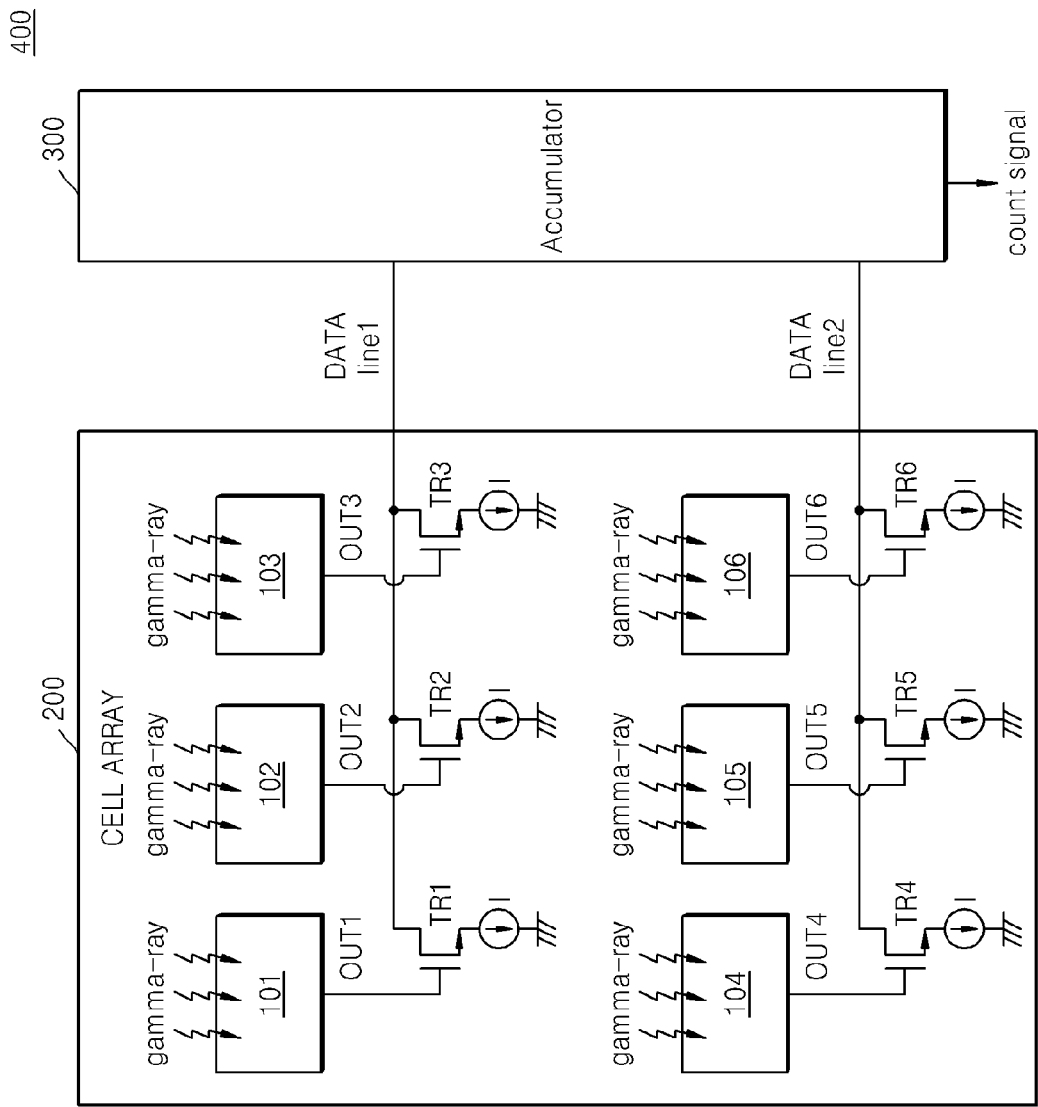
FIG. 7 is a diagram illustrating a radiation detecting system that includes an accumulator and a cell array including photomultiplier detector cells for tomography, according to example embodiments.

FIG. 7 is a diagram illustrating a radiation detecting system 400 that includes an accumulator 300 and a cell array 200 including photomultiplier detector cells 101, 102, 103, 104, 105 and 106 for tomography, according to example embodiments. In this regard, the cell array 200 may be included in a radiation detecting module or a pixel element, and may also indicate a plurality of detector cells.

Referring to FIG. 7, the radiation detecting system 400 includes the cell array 200 and the accumulator 300. The cell array 200 includes the photomultiplier detector cells 101, 102, 103, 104, 105 and 106 for tomography. Each of the photomultiplier detector cells 101, 102, 103, 104, 105 and 106 has a similar structure to that of the photomultiplier detector cell 100 illustrated in FIG. 3. Thus, each of the photomultiplier detector cells 101, 102, 103, 104, 105 and 106 may include a detector unit and a readOUT unit, and be connected to a scintillator. In FIG. 7, only 6 detector cells included in the cell array 200 are illustrated for convenience of explanation, but example embodiments are not limited thereto and the number of the detector cells is may be more or fewer than 6 detectors cells. In addition, for convenience of explanation, it is illustrated in FIG. 7 that 3 detector cells are connected to a single data line, but the number of the detector cells that are connected to a single data line is not limited thereto. In addition, 2 data lines are illustrated in FIG. 7 for convenience of explanation, but the number of the data lines is provided only for illustrative purposes and is not intended to limit the scope of example embodiments.

The photomultiplier detector cells 101, 102, 103, 104, 105 and 106 each generate output signals OUT1, OUT2, OUT3, OUT4, OUT5 and OUT6, respectively, which are in the form of a signal format that the accumulator 300 can receive, without separately storing or counting the detect signals. The output signals OUT1, OUT2, OUT3, OUT4, OUT5 and OUT6 turn on or turn off switching circuits TR1, TR2, TR3, TR4, TR5 and TR6, respectively. When the switching circuit TR1, TR2, TR3, TR4, TR5 and TR6 is respectively turned on or turned off, the amount of current that flows in a first data line DATA line1 and a second data line DATA line2 varies. The current flowing in the data lines is transmitted to the accumulator 300. The accumulator 300 receives the current flowing in the data lines to count or store the amount of detected radiation (e.g., gamma-ray).

Therefore, a space for an internal memory or a buffer in the cell array 200 is not needed, the size of a chip may be reduced, and integration may be obtained. In addition, energy resolution of each of the detector cells 101, 102, 103, 104, 105 and 106 does not depend on the capacity of an internal memory or a buffer, but depends on the capacity of a memory of the accumulator 300 which may have a relatively high capacity, and thus, high resolution detecting may be performed.

Figure 8:
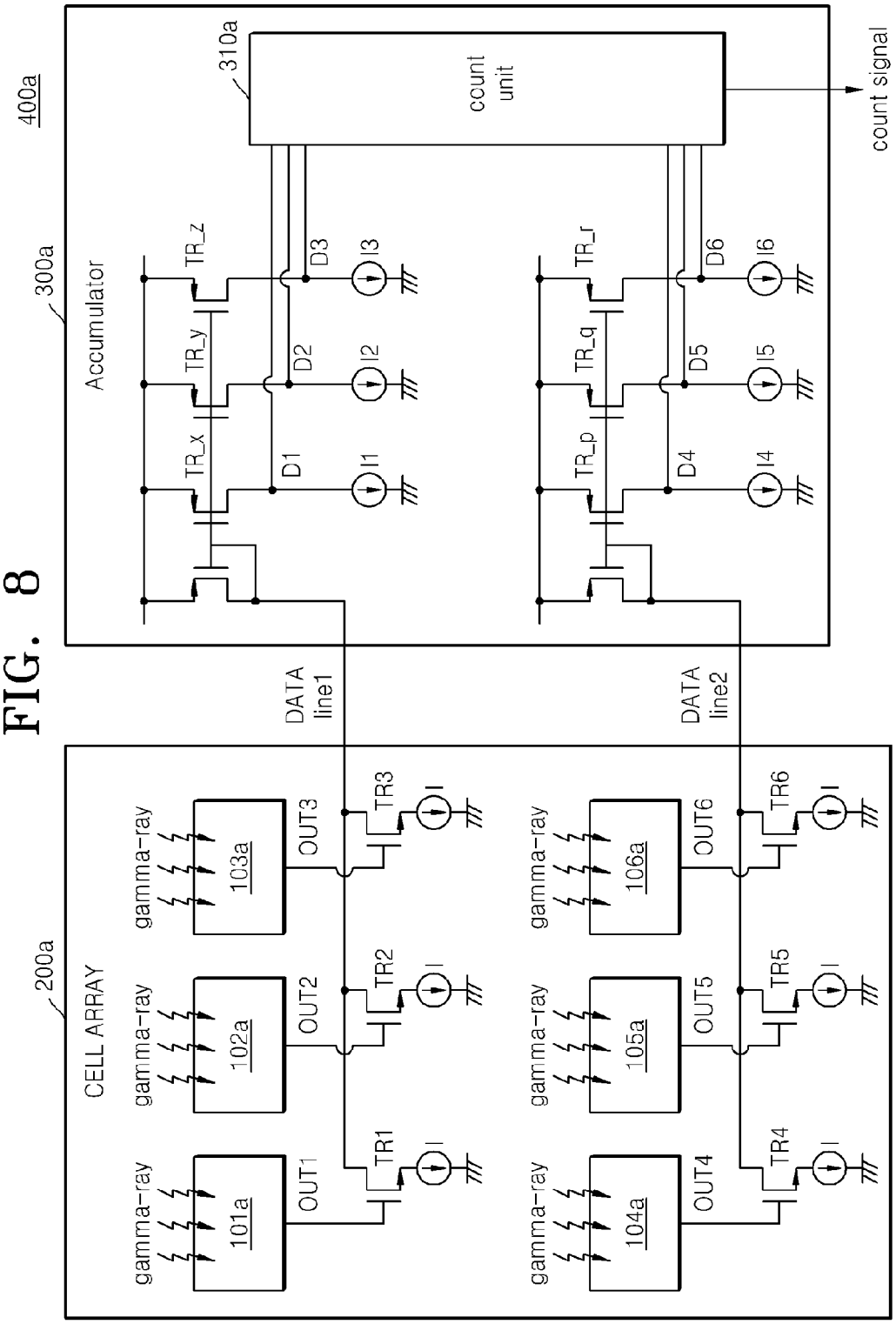
FIG. 8 is a diagram illustrating a radiation detecting system that includes an accumulator and a cell array including photomultiplier detector cells for tomography, according to example embodiments.

FIG. 8 is a diagram illustrating a radiation detecting system 400a that includes an accumulator 300a and a cell array 200a including photomultiplier detector cells 101a, 102a, 103a, 104a, 105a and 106a for tomography, according to example embodiments.

Referring to FIG. 8, the radiation detecting system 400a includes the cell array 200a and the accumulator 300a. The cell array 200a includes the photomultiplier detector cells 101a, 102a, 103a, 104a, 105a and 106a for tomography. The cell array 200a has a similar structure to that of the cell array 200 of FIG. 7. Similarly as described above with respect to the cell array 200 of FIG. 7, the number of detector cells of the cell array 200a, the number of detector cells that are connected to a single data line, and the number of the data lines are provided only for illustrative purposes and are not intended to limit the scope of example embodiments.

The accumulator 300a includes a count unit 310a. The count unit 310a counts the number of cells that receive radiation. The count unit 310a generates a count signal which indicates the number of counted cells. The count unit 310a may include a plurality of sub-counters (refer to FIG. 9). Each sub-counter may count the number of cells that receive radiation and are connected to a single data line. The count unit 310a may combine sub-counter signals generated by the plurality of sub-counters to generate a count signal.

Referring to FIG. 8, the accumulator 300a receives current from the cell array 200a through first and second data lines DATA line1 and DATA line2. Switches TR1, TR2 and TR3 are turned on or turned off by output signals OUT1, OUT2 and OUT3 that are output from photomultiplier detector cells 101a, 102a and 103a. When the switches TR1, TR2 and TR3 are turned on, current flows in the first data line DATA line1 according to the number of detector cells by which radiation (e.g., gamma-rays) is detected.

For example, if radiation is detected only in the photomultiplier detector cell 101a and is not detected in the photomultiplier detector cells 102a and 103a, only the switch TR1 is turned on so that a current I flows in the first data line DATA line1. If the current I flows in the first data line DATA line1, the current I may also flow in switches TR_x, TR_y and TR_z of the accumulator 300a through a current mirror. In this case, a first data D1 may enter a high state, and a second data D2 and a third data D3 may enter a low state.

Alternatively, if radiation is detected in the photomultiplier detector cells 101a and 102a and is not detected in the photomultiplier detector cell 103a, the switches TR1 and TR2 are turned on so that a current 2I (i.e., a current that is double the current I) flows in the first data line DATA line1. If the current 2I flows in the first data line DATA line1, a current 4I (i.e., a current that is four times greater than the current I) may flow in the switches TR_x, TR_y and TR_z of the accumulator 300a through a current mirror. In this case, the first data D1 and the second data D2 may enter a high state, and the third data D3 may enter a low state.

Alternatively, if radiation is detected in the three photomultiplier detector cells 101a, 102a and 103a, a current 3I (i.e., a current that is three times greater than the current I) flows in the first data line DATA line1. In this case, the first data D1, the second data D2, and the third data D3 may enter a high state.

Figure 9:
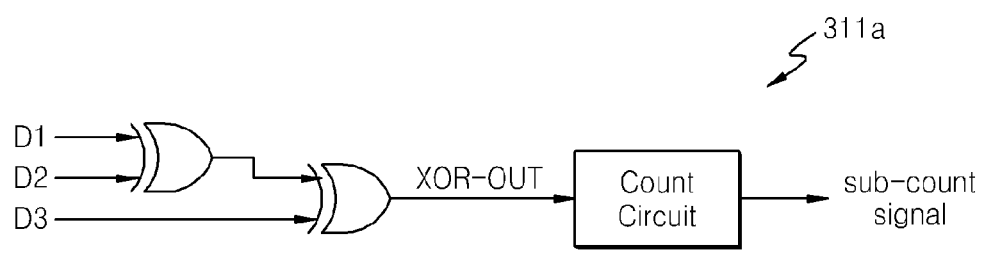
FIG. 9 is a diagram illustrating a sub-counter included in a count unit, according to example embodiments.

FIG. 9 is a diagram illustrating a sub-counter 311a included in the count unit 310a of FIG. 8, according to example embodiments. The sub-counter 311a receives a first data D1, a second data D2, and a third data D3 to output them as a sub-count signal. In particular, the sub-counter 311a receives the first and second data D1 and D2 and performs an XOR operation thereon. An XOR operation is performed on the value obtained as a result of the XOR operation and the third data D3 to generate a signal XOR-OUT. The signal XOR-OUT is input to a count circuit. The count circuit receives the signal XOR-OUT to output it as the sub-count signal. A count signal may be generated by performing a logical operation on sub-count signals that differ from a sub-count signal 1.

Figure 10A:
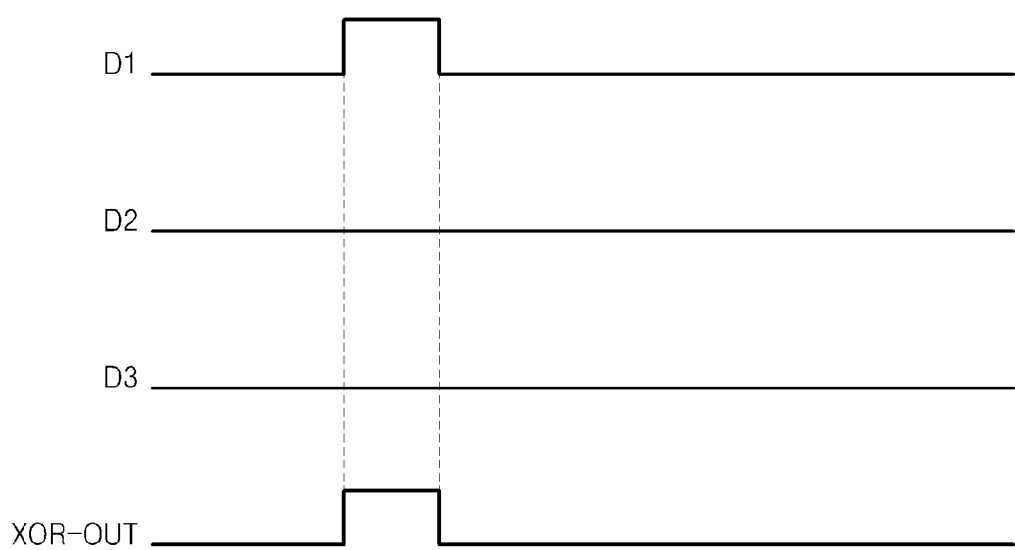
FIGS. 10A through 10C are timing graphs each illustrating data and a signal according to current that flows in a data line, according to example embodiments.
Figure 10B:
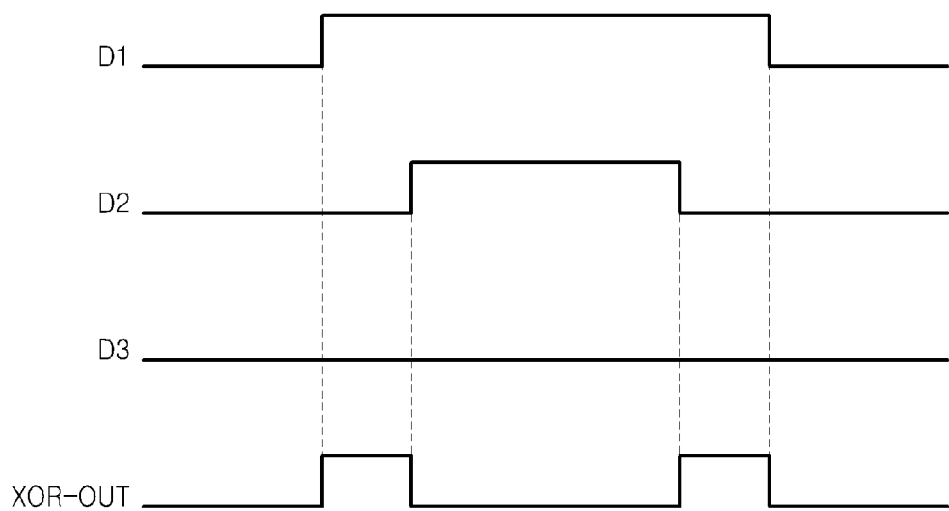
Figure 10C:
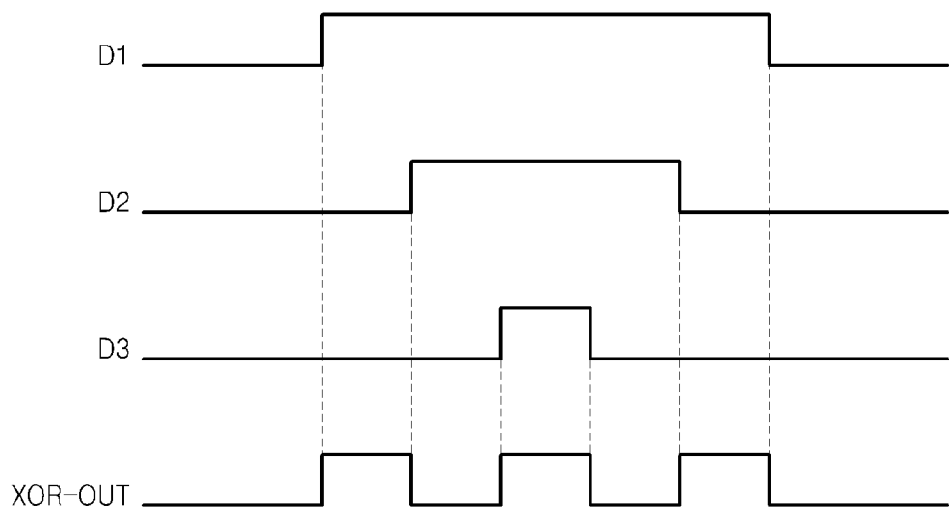

FIGS. 10A through 10C are timing graphs each illustrating first, second and third data D1, D2 and D3 and a signal XOR-OUT according to a current that flows in a first data line DATA line1, according to example embodiments. In particular, FIG. 10A illustrates a timing graph of the first, second and third data D1, D2 and D3 and the signal XOR-OUT when the first D1 is in a high state and the second data D2 and the third data D3 are in a low state. FIG. 10B illustrates a timing graph of the first, second and third data D1, D2 and D3 and the signal XOR-OUT when the first data D1 and the second data D2 are in a high state and the third data D3 is in a low state. FIG. 10C illustrates a timing graph of the first, second and third data D1, D2 and D3 and the signal XOR-OUT when the first data D1, the second data D2, and the third data D3 are in a high state.

Referring to FIGS. 8, 7, and 10A, if the current I flows in the first data line DATA line1, the first data D1 may enter a high state and the second data D2 and the third data D3 may enter a low state. Thus, the signal XOR-OUT is the same as illustrated in FIG. 10A. The count circuit may count a rising edge or a falling edge of the signal XOR-OUT. Therefore, a sub-count signal 1 may be a signal representing 1.

Referring to FIGS. 7, 8, and 10B, if the current 2I flows in the first data line DATA line1, the first data D1 and the second data D2 may enter a high state and the third data D3 may enter a low state. Thus, the signal XOR-OUT is the same as illustrated in FIG. 10B. The count circuit may count a rising edge or a falling edge of the signal XOR-OUT. Therefore, the sub-count signal 1 may be a signal representing 2.

Referring to FIGS. 7, 8, and 10C, if the current 3I flows in the first data line DATA line1, the first data D1, the second data D2, and the third data D3 may enter a high state. Thus, the signal XOR-OUT is the same as illustrated in FIG. 10C. The count circuit may count a rising edge or a falling edge of the signal XOR-OUT. Therefore, the sub-count signal 1 may be a signal representing 3.

Hereinafter, an operation of the radiation detecting system 400a of FIG. 8 will be described. There are detector cells that detect radiation and detector cells that do not detect radiation in the photomultiplier detector cells 101a, 102a, 103a, 104a, 105a and 106a included in the cell array 200a. The number of the detector cells that detect radiation may increase in proportion to the density of radiation. The detector cells that detect radiation output whether or not the radiation is detected through the output signals OUT1, OUT2, OUT3, OUT4, OUT5 and OUT6. The output signals OUT1, OUT2, OUT3, OUT4, OUT5 and OUT6 turn on or turn off the switches TR1, TR2, TR3, TR4, TR5 and TR6. The switch in an ON state enables current to flow through the first data line DATA line1 or the second data line DATA line2. At this time, the first, second and third data D1, D2 and D3 are turned on or turned off to be input to the count unit 310a. A case of the second data line DATA line2 is similar to that of the first data line DATA line1. The count unit 310a performs a calculation based on the first to sixth data D1 to D6 to obtain a count signal, which indicates the number of counted detector cells, and then outputs the count signal. Therefore, photons that are consecutively incident or almost simultaneously incident may be detected through these processes.

Figure 11:
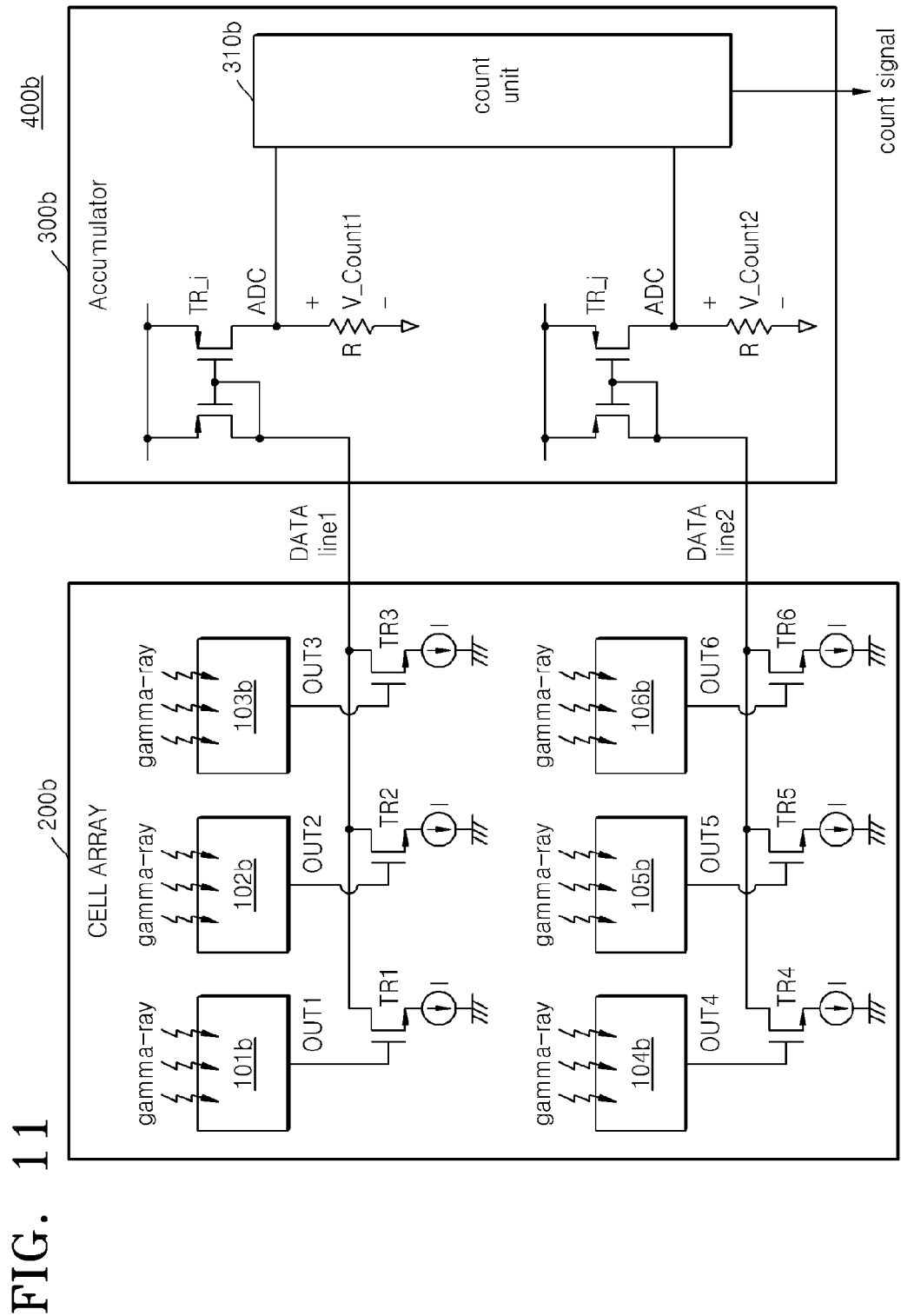
FIG. 11 is a diagram illustrating a radiation detecting system that includes an accumulator and a cell array including photomultiplier detector cells for tomography, according to example embodiments.

FIG. 11 is a diagram illustrating a radiation detecting system 400b that includes an accumulator 300b and a cell array 200b including photomultiplier detector cells 101b, 102b, 103b, 104b, 105b and 106b for tomography, according to example embodiments.

Referring to FIG. 11, the radiation detecting system 400b includes the cell array 200b and the accumulator 300b. The cell array 200b includes the photomultiplier detector cells 101b, 102b, 103b, 104b, 105b and 106b for tomography. The cell array 200b has a similar structure to that of the cell array 200 of FIG. 7. Similarly as described above with respect to the cell array 200, in example embodiments, the number of detector cells of the cell array 200b, the number of detector cells that are connected to a single data line, and the number of the data lines are provided only for illustrative purposes and are not intended to limit the scope of example embodiments.

The accumulator 300b includes a count unit 310b. The count unit 310b counts the number of detector cells that receive radiation. The count unit 310b generates a count signal that indicates the number of counted detector cells. The count unit 310b may include a plurality of sub-counters. Each sub-counter may count the number of detector cells that are connected to a single data line and receive radiation. The count unit 310b may generate a count signal by combining sub-counter signals generated by the plurality of sub-counters.

The accumulator 300b receives current from the cell array 200b through first and second data lines DATA line1 and DATA line2. Switches TR1, TR2 and TR3 are turned on or turned off by output signals OUT1, OUT2 and OUT3, respectively, which are output from the photomultiplier detector cells 101b, 102b and 103b, respectively. When the switches TR1, TR2 and TR3 are turned on, a current corresponding to the data line flows according to the number of detector cells by which radiation is detected. For example, if radiation is detected only in the photomultiplier detector cell 101b and not detected in the photomultiplier detector cells 102b and 103b, only the switch TR1 is turned on so that a current I flows in the first data line DATA line1. For example, if radiation is detected in the photomultiplier detector cells 101b and 102b and not detected in the photomultiplier detector cell 103b, the switches TR1 and TR2 are turned on so that a current 2I flows in the first data line DATA line1. Similarly, if radiation is detected in the photomultiplier detector cells 101b, 102b and 103b, a current 3I (i.e., a current that is three times greater than the current I) flows in the first data line DATA line1.

The accumulator 300b includes the count unit 310b. If the current I flows in the first data line DATA line1, the current I also flows in a switch Tr_i that is opposite to a current mirror. Therefore, V_count1 denotes a value obtained by multiplying a resistance R by a current I. That is, V_count1=R×I. Similarly, if the current 2I flows in the first data line DATA line1, a current 4I flows in the switch Tr_i that is opposite to a current mirror. Therefore, V_count1 denotes a value obtained by multiplying a resistance R by the current 2I. That is, V_count1=R×2I. Similarly, if the current 3I flows in the first data line DATA line1, a current 5I flows in the switch Tr_i. Therefore, V_count1 denotes a value obtained by multiplying a resistance R and the current 3I. That is, V_count1=R×3I. In other words, V_count1=R×I if the number of detector cells that detect radiation is 1, V_count1=R×2I if the number of detector cells that detect radiation is 2, and V_count1=R×3I if the number of detector cells that detect radiation is 3. Therefore, the count unit 310b may detect the density of radiation according to the intensity of voltage. Accordingly, the count unit 310b generates the count signal. Similarly, if the current I flows in the second data line DATA line 2, the current also flows in a switch Tr_j that is opposite to a current mirror. Similarly, V_count2 denotes a value obtained by multiplying a resistance R by a current I (or 2I or 3I), depending on the number of detector cells 104b, 105b, and 106b, that detect radiation.

Figure 12A:
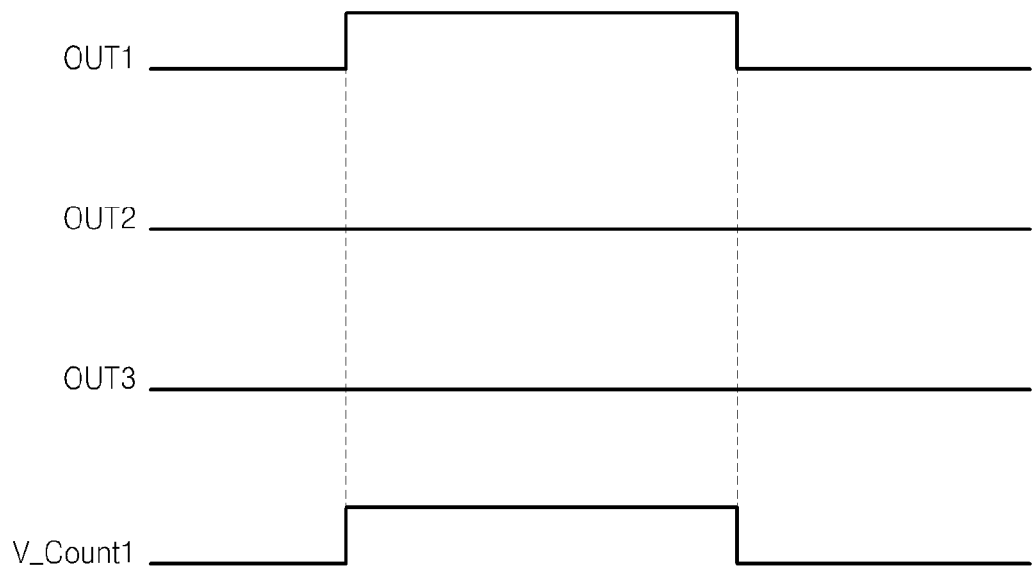
FIGS. 12A through 12C are timing graphs each illustrating output signals and a count voltage according to current that flows in a data line, according to example embodiments.
Figure 12B:
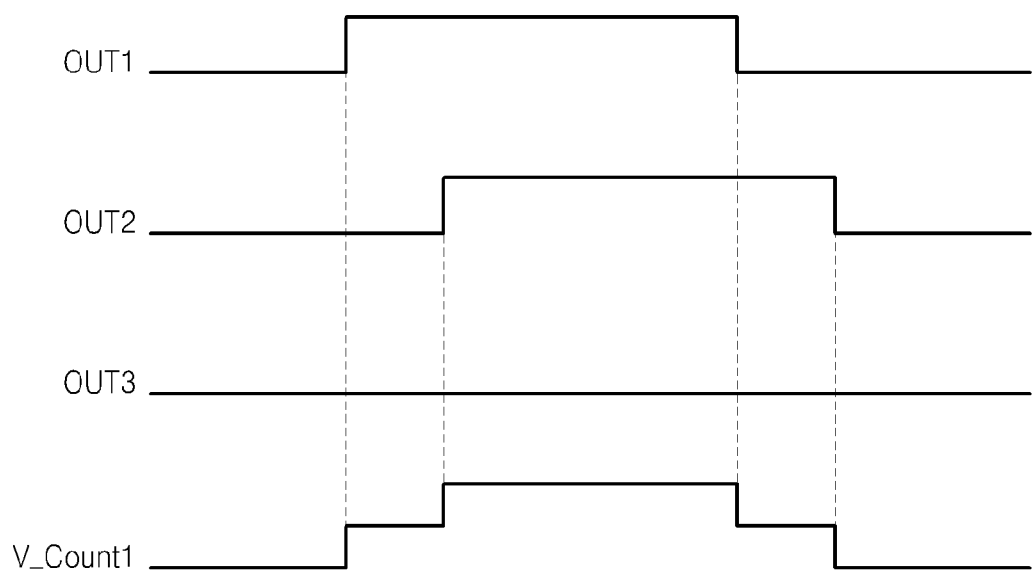
Figure 12C:
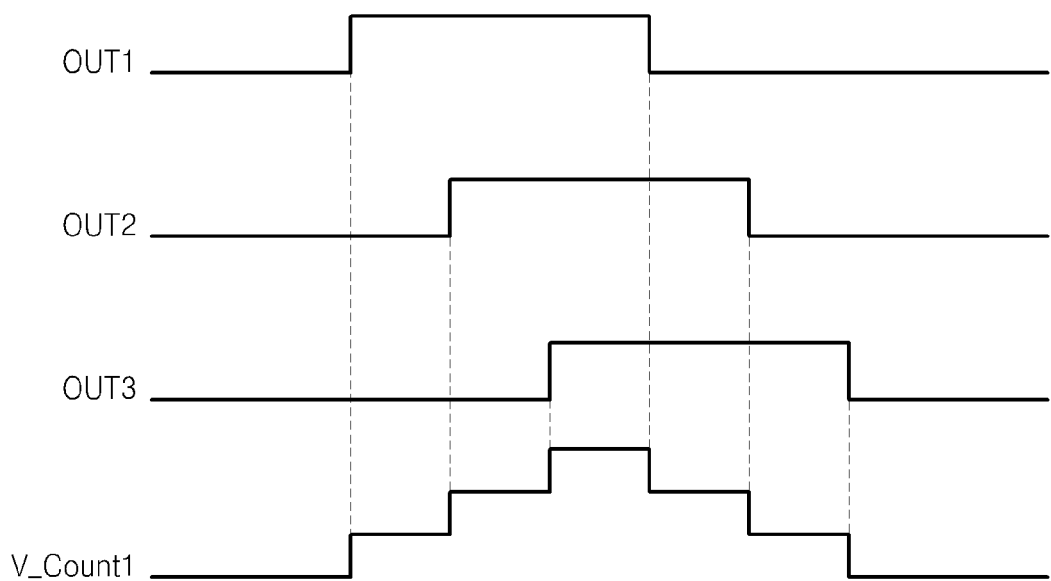

FIGS. 12A through 12C are timing graphs each illustrating output signals OUT1, OUT2 and OUT3 and a count voltage V_count according to current that flows in a first data line DATA line1, according to example embodiments. In particular, FIG. 12A illustrates a timing graph of the output signals OUT1, OUT2 and OUT3 and the count voltage V_count when the switch TR1 is turned on and the switches TR2 and TR3 are turned off. FIG. 12B illustrates a timing graph of the output signals OUT1, OUT2 and OUT3 and the count voltage V_count when the switches TR1 and TR2 are turned on and the switch TR3 is turned off. FIG. 12C illustrates a timing graph of the output signals OUT1, OUT2 and OUT3 and the count voltage V_count when the switches TR1, TR2 and TR3 are turned on.

Referring to FIGS. 11 and 12A, the timing graph of FIG. 12A illustrates a case where radiation is detected in the photomultiplier detector cell 101b and is not detected in the photomultiplier detector cells 102b and 103b. The switch TR1 is turned on by the output signal OUT1, the switch TR2 is turned on by the output signal OUT2, and the switch TR3 is turned on by the output signal OUT3. Thus, the current I flows in the first data line DATA line1 and the current I also flows in the switch TR_i. Therefore, the count voltage V_count1 may be represented as R×I. Accordingly, the count unit 310b may measure the density of the radiation by using the number of rising edges or the intensity of a maximum voltage.

Referring to FIGS. 11 and 12B, the timing graph of FIG. 12B illustrates a case where radiation is detected in the photomultiplier detector cells 101b and 102b and is not detected in the photomultiplier detector cell 103b. The switch TR1 is turned on by the output signal OUT1, the switch TR2 is turned on by the output signal OUT2, and the switch TR3 is turned off by the output signal OUT3. Thus, the current 2I flows in the first data line DATA line1 and the current 2I also flows in the switch TR_i. Therefore, the count voltage V_count1 may be represented as R×2I. In this regard, since radiation is not simultaneously detected in the photomultiplier detector cells 101b and 102b, there may be a time difference therebetween. Due to such a time difference, the count voltage V_count1 may increase stepwise. Therefore, the count unit 310b may count the number of rising edges and measure the density of the radiation by using the intensity of a maximum voltage.

Referring to FIGS. 11 and 12C, the timing graph of FIG. 12C illustrates a case where radiation is detected in the photomultiplier detector cells 101b, 102b and 103b. The switch TR1 is turned on by the output signal OUT1, the switch TR2 is turned on by the output signal OUT2, and the switch TR3 is turned on by the output signal OUT3. Thus, the current 3I flows in the first data line DATA line1 and also flows in the switch TR_i. Therefore, the count voltage V_count1 may be represented as R×3I. In this regard, as in the case of FIG. 12B, since radiation is not simultaneously detected in the photomultiplier detector cells 101b and 102b, there may be a time difference therebetween. Due to such a time difference, the count voltage V_count1 may increase stepwise. Therefore, the count unit 310b may count the number of rising edges and measure the density of the radiation by using the intensity of a maximum voltage.

Hereinafter, an operation of the radiation detecting system 400b of FIG. 11 will be described. The operation thereof is similar to that of the radiation detecting system 400a of FIG. 8. The first data line DATA line1 changes the count voltage V_count1 according to the number of detector cells that detect radiation. In particular, V_count1=R×I if the number of detector cells that detect radiation is 1, V_count1=R×2I if the number of detector cells that detect radiation is 2, and V_count1=R×3I if the number of detector cells that detect radiation is 3. The count unit 310b performs a calculation based on the intensity of the count voltage V_count1, which indicates the number of counted detector cells that detect radiation, to obtain a count signal and output the count signal. Therefore, photons that are consecutively incident or almost simultaneously incident may be detected through these processes.

According to example embodiments, a method of operating a radiation detecting system may include exposing a radiation-emitting source to a cell array that includes a scintillator and a switching circuit connected to a plurality of photomultiplier detector cells. The scintillator may be configured to generate light having a certain range of wavelength (e.g., visible light) based on radiation received from the radiation-emitting source (e.g., gamma-ray radiation). Each of the plurality of photomultiplier detector cells may include a detector unit that is configured to generate a digitized detect signal in response to receiving the light, and a readOUT unit that is configured to generate an output signal after receiving the digitized detect signal and to transmit the output signal to the switching circuit right after receiving the digitized detect signal. The method may further include transmitting a current signal from the switching circuit to an accumulator that is located outside of the cell array, where the current signal may correspond to a number of the plurality of photomultiplier detector cells detecting light.

Although FIGS. 4, 5A, 6A, 6B illustrate detector units 130, 130a, and 130b that include Photo Diodes 133, 133a, and 133b, respectively, example embodiments are not limited thereto. For example, in example embodiments, a detector unit may alternatively include a different light-sensing element (e.g., light sensor transistor) having at least two terminals instead of one of the Photo Diodes 133, 133a, and 133b for generating a current based on photons emitted from the scintillator. A non-limiting example of a light sensor transistor is disclosed in FIG. 1, reference number 140, and the corresponding description in US 2012/0267513, which is incorporated by reference herein.

It should be understood that shapes of elements in the accompanying drawings are only for illustrative purposes to clearly explain inventive concepts. That is, many different shapes other than the shapes in the accompanying drawings are possible.

While some example embodiments have been particularly shown and described, it will be understood by one of ordinary skill in the art that variations in form and detail may be made therein without departing from the spirit and scope of the claims. Descriptions of features or aspects within some example embodiments should typically be considered as available for other similar features or aspects in other example embodiments

What is claimed is:

1. A photomultiplier detector cell for tomography, comprising:
   a detector unit that is configured to generate a digitized detect signal in response to receiving light having a certain range of wavelength, the detector including a passive quenching unit that includes a capacitor; and
   a readOUT unit,
      the readOUT unit being configured to generate an output signal corresponding to the detect signal generated by the detector unit and to transmit the output signal to an external circuit, and
      the readOUT unit being configured to transmit the output signal to the external circuit right after receiving the detect signal.

2. The photomultiplier detector cell of claim 1, wherein the readOUT unit is not configured to store the detect signal in the photomultiplier detector cell.

3. The photomultiplier detector cell of claim 1, wherein the detector unit includes a photomultiplier, and the photomultiplier includes a silicon device.

4. The photomultiplier detector cell of claim 1, wherein the detector unit includes:
   a photo diode that is configured to generate a current to flow in response to the light having the certain range of wavelength; and
   an active reset unit that is connected to a cathode of the photo diode, wherein
   the active reset unit being configured to increase a voltage difference between the cathode and an anode of the photo diode.

5. The photomultiplier detector cell of claim 4, wherein
   the passive quenching unit that is connected to the cathode of the photo diode, and
   the passive quenching unit is configured to decrease the voltage difference between the cathode and the anode of the photo diode when the current flows in the photo diode.

6. The photomultiplier detector cell of claim 5, wherein
   the detector unit is configured to control a voltage applied to the capacitor.

7. The photomultiplier detector cell of claim 1, wherein
   the detect signal undergoes a transition from a first voltage level to a second voltage level in response to the reception of the light having the certain range of wavelength and
   undergoes a transition from the second voltage level to the first voltage level when the reception of the light having the certain range of wavelength is stopped.

8. The photomultiplier detector cell of claim 1, further comprising:
   a scintillator configured to receive radiation and generate the light having the certain range of wavelength,
   wherein the detector unit is connected to the scintillator.

9. The photomultiplier detector cell of claim 8, wherein
   the detector unit is configured to receive the light having the certain range of wavelength that is generated by the scintillator, and
   the light having the certain range of wavelength has a wavelength of about 400 nm to about 450 nm.

10. A radiation detecting system for tomography, comprising:
   an accumulator; and
   at least one photomultiplier cell including,
      a detector unit that that is configured to generate a digitized detect signal in response to receiving light having a certain range of wavelength, and
      a readOUT unit configured to generate an output signal corresponding to the detect signal generated by the detector unit,
      the detector including a passive quenching unit that includes a capacitor,
      the readOUT unit being configured to transmit the output signal to the accumulator right after the detect signal is generated by the detector unit,
      the accumulator being configured to measure an amount of radiation based on the output signal received by the readOUT.

11. The radiation detecting system of claim 10, wherein the readOUT unit is not configured to store the output signal in the photomultiplier detector cell.

12. The radiation detecting system of claim 10, wherein
   the detector unit of the at least one photomultiplier cell includes a photomultiplier, and
   the photomultiplier includes a silicon device.

13. The radiation detecting system of claim 10, wherein the accumulator includes a current mirror circuit.

14. The radiation detecting system of claim 13, wherein
   the at least one photomultiplier cell includes a plurality of photomultiplier cells, the accumulator includes a plurality of current mirror circuits, the accumulator is configured to generate a plurality of digital signals based on turning on or turning off a transistor of each of the plurality of current mirror circuits in response to the output signal received from the readOUT units of the plurality of photomultiplier cells, and the accumulator includes a count unit that is configured to receive the plurality of digital signals and to measure an amount of radiation based on the plurality of digital signals.

15. The radiation detecting system of claim 13, wherein a transistor at an output terminal of the current mirror circuit is connected to a resistor and the accumulator is configured to measure an amount of radiation based on an intensity of a voltage applied between both terminals of the resistor.

16. The radiation detecting system of claim 10, wherein the detector unit of the at least one photomultiplier cells includes:

a photo diode that is configured to generate a current to flow in response to the light having the certain range of wavelength; and an active reset unit that is connected to a cathode of the photo diode, the active reset unit being configured to increase a voltage difference between the cathode and an anode of the photo diode.

17. The radiation detecting system of claim 16, wherein the passive quenching unit is connected to the cathode of the photo diode, and the passive quenching unit is configured to decrease the voltage difference between the cathode and the anode of the photo diode when the current flows in the photo diode.

18. The radiation detecting system of claim 17, wherein a voltage of the capacitor is controlled by environmental changes of the photomultiplier detector cell.

19. The radiation detecting system of claim 10, further comprising:

a scintillator configured to receive radiation and to generate the light having the certain range of wavelength, wherein the detector unit of the at least one photomultiplier detector cell is connected to the scintillator.

20. The radiation detecting system of claim 19, wherein the detector unit of the at least one photomultiplier cell is configured to receive the light having the certain range of wavelength that is generated by the scintillator, and the light having the certain range of wavelength has a wavelength of about 400 nm to about 450 nm.

21. A detecting device included in a photomultiplier detector cell for tomography, the detecting device comprising:

a photo diode that is configured to generate a current to flow in response to light having a certain range of wavelength;

an active reset unit that is connected to a cathode of the photo diode, the active reset unit being configured to increase a voltage difference between the cathode and anode of the photo diode; and a passive quenching unit connected to a cathode of the photo diode, the passive quenching unit including a capacitor.

22. The detecting device of claim 21, wherein the passive quenching unit is configured to decrease the voltage difference between the cathode and the anode of the photo diode when the current flows in the photo diode.

23. The detecting device of claim 22, wherein a voltage of the capacitor is controlled by environmental changes of the photomultiplier detector cell.

24. The detecting device of claim 21, wherein the detecting device is configured to generate a digitized detect signal in response to the light having the certain range of wavelength, and the detecting device does not store the detect signal in the photomultiplier detector cell.

25. The detecting device of claim 24, wherein the detect signal undergoes a transition from a first voltage level to a second voltage level in response to the reception of the light having the certain range of wavelength and undergoes a transition from a second voltage level to a first voltage level when the reception of the light having the certain range of wavelength is stopped.

26. The detecting device of claim 21, wherein the light having the certain range of wavelength has a wavelength of about 400 nm to about 450 nm.

27. A detector unit in a photomultiplier detector cell for tomography that is not configured to store a detect signal generated from a light-sensing element, the detector unit comprising:

the light-sensing element that is configured to generate the detect signal in response to receiving light having a certain range of wavelength;

an active reset unit connected to a first terminal of the light-sensing element, the active reset unit being configured to increase a voltage difference between the first terminal and a second terminal of the light-sensing element;

a passive quenching unit connected to a cathode of the light-sensing element, the passive quenching unit including a capacitor.

28. A photomultiplier detector cell, comprising:

a readOUT unit that is configured to generate an output signal after receiving a digitized detect signal, the readOUT unit being configured to transmit the output signal to an external circuit without the output signal being stored in the photomultiplier detector cell; and a detector unit that is configured to generate the digitized detect signal in response to receiving light having a certain range of wavelength, the detector unit being configured to transmit the digitized detect signal to the readOUT unit without the detect signal being stored in the photomultiplier detector cell, and the detector including a passive quenching unit that includes a capacitor.

29. The photomultiplier detector cell of claim 28, wherein the detector unit includes a photo diode.

30. The photomultiplier detector cell of claim 29, wherein the passive quenching unit is electrically connected to a cathode of the photo diode, the passive quenching unit is configured to receive a supply voltage, and the supply voltage is lower than a breakdown voltage of the photo diode.

31. The photomultiplier detector cell of claim 29, wherein the photo diode is connected to a scintillator outside of the photomultiplier detector cell.

32. The photomultiplier detector cell of claim 29, wherein the photo diode is configured to generate a current in response to receiving the light having the certain range of wavelength, the detector unit further includes an active quenching unit, the passive quenching unit and active quenching unit are electrically connected to a cathode of the photo diode, the detector unit further includes an active reset unit connected to the cathode of the photo diode, and the passive quenching unit, the active quenching unit, and the active reset unit, in combination, are configured to convert the current from the photo diode into the digitized detect signal.

33. The photomultiplier detector cell of claim 32, wherein the active quenching unit and the active reset unit each include a transistor.

34. The photomultiplier detector cell of claim 28, wherein the detector unit includes a photo diode, the detector unit includes an active reset unit that is electrically connected between a cathode of the photo diode and a supply voltage node, the supply voltage node is configured to supply a supply voltage that is lower than a breakdown voltage of the photo diode, and the active reset unit is configured to increase a voltage difference between the cathode and an anode of the photo diode.

35. The photomultiplier detector cell of claim 34, wherein the passive quenching unit that is electrically connected between a supply voltage node and the cathode of the photo diode.

36. The photomultiplier detector cell of claim 35, wherein the detector unit further includes an active quenching unit that is electrically connected between a ground voltage node and the cathode of the photo diode.

37. The photomultiplier detector cell of claim 36, wherein the passive quenching unit and the active reset unit are electrically connected in parallel between the cathode of the photo diode and the supply voltage node.

38. A radiation detecting system comprising:
an accumulator;
a cell array including a plurality of photomultiplier detector cells according to claim 28 connected to a plurality of switches, respectively, and a current source,
each of the plurality of switches being configured to be turned on and supply current from the current source when a corresponding one of the plurality of photomultiplier detector cells detects radiation, and be configured to be turned off when the corresponding one the plurality of photomultiplier detectors cells does not detect radiation; and
a data line for transporting a current signal to the accumulator according to a number of the plurality of photomultiplier detectors cells detecting radiation.

39. The radiation detecting system of claim 38, wherein
the accumulator includes a current mirror circuit and a count unit,
the current mirror circuit is configured to adjust the current signal and transmit the adjusted current signal to the count unit, and
the count unit is configured to determine the number of the plurality of photomultiplier detectors cells detecting radiation based upon converting the adjusted current signal into a count signal.

40. The radiation detecting system of claim 38,
the accumulator includes a current mirror circuit and a count unit,
the current mirror circuit is configured to adjust the current signal into a voltage signal and transmit the voltage signal to the count unit, and
the count unit is configured to determine the number of the plurality of photomultiplier detectors cells detecting radiation based upon converting the voltage signal into a count signal.

41. A method of operating a radiation detecting system, comprising:
exposing a radiation-emitting source to a cell array that includes a scintillator and a switching circuit connected to a plurality of photomultiplier detector cells,
the scintillator being configured to generate light having a certain range of wavelength based on radiation received from the radiation-emitting source,
each of the plurality of photomultiplier detector cells including,
a detector unit that is configured to generate a digitized detect signal in response to receiving the light, the detector including a passive quenching unit that includes a capacitor, and
a readOUT unit that is configured to generate an output signal after receiving the digitized detect signal and to transmit the output signal to the switching circuit right after receiving the digitized detect signal; and
transmitting a current signal from the switching circuit to an accumulator that is located outside of the cell array, the current signal corresponding to a number of the plurality of photomultiplier detector cells detecting light.

* * * * *